(12) United States Patent
Nishino et al.

(10) Patent No.: US 10,365,014 B2
(45) Date of Patent: Jul. 30, 2019

(54) HEAT EXCHANGER AND COMBUSTION DEVICE

(71) Applicant: Rinnai Corporation, Nagoya-shi, Aichi (JP)

(72) Inventors: Akifumi Nishino, Nagoya (JP); Hidekatsu Naruse, Nagoya (JP)

(73) Assignee: Rinnai Corporation, Nagoya-shi (JP)

( * ) Notice: Subject to any disclaimer, the term of this patent is extended or adjusted under 35 U.S.C. 154(b) by 0 days.

(21) Appl. No.: 15/718,128

(22) Filed: Sep. 28, 2017

(65) Prior Publication Data

US 2018/0106498 A1    Apr. 19, 2018

(30) Foreign Application Priority Data

Oct. 14, 2016    (JP) ................................ 2016-202458

(51) Int. Cl.
   *F28F 1/32*     (2006.01)
   *F24H 1/14*     (2006.01)
   (Continued)

(52) U.S. Cl.
   CPC ............... *F24H 1/145* (2013.01); *F24H 1/24* (2013.01); *F24H 1/40* (2013.01); *F28D 1/0535* (2013.01); *F28D 1/05358* (2013.01); *F28D 7/1623* (2013.01); *F28D 21/0007* (2013.01); *F28F 1/02* (2013.01); *F28F 1/12* (2013.01); *F28F 1/32* (2013.01); *F24H 8/00* (2013.01); *Y02B 30/102* (2013.01)

(58) Field of Classification Search
   CPC .... B23K 1/0012; F28F 2275/04; F28F 9/001; Y10T 29/49393; Y10T 403/479
   See application file for complete search history.

(56) References Cited

U.S. PATENT DOCUMENTS 6,453,989 B1 *  9/2002  Watanabe ............. F28D 1/0341
                                                138/38
7,207,179 B2 *  4/2007  Kitamura ............. B21D 39/048
                                                62/115

(Continued)

FOREIGN PATENT DOCUMENTS

JP          05141889 A  *  6/1993
JP          2001-153468    6/2001
JP          2011-231993   11/2011

*Primary Examiner* — Gregory A Wilson
(74) *Attorney, Agent, or Firm* — Amin, Turocy & Watson LLP

(57) ABSTRACT

A heat exchanger including a heat transfer fin (1) having a heat-transfer-tube insertion hole (10) through which a heat transfer tube (40) is inserted, and a brazing material holding portion (100) provided above the heat-transfer-tube insertion hole (10) to hold a brazing material (4), wherein when the heat transfer tube (40) is inserted through the heat-transfer-tube insertion hole (10), left and right non-contact portions (15), (16) where a circumferential edge of the heat-transfer-tube insertion hole (10) and an outer circumferential surface of the heat transfer tube (40) are not in contact with each other are separately formed on an upper circumferential edge of the heat-transfer-tube insertion hole (10), and a brazing material guiding portion (100) extending toward the outer circumferential surface of the heat transfer tube (40) is formed between the left and right non-contact portions (15), (16).

5 Claims, 6 Drawing Sheets

(51) Int. Cl.
    *F28D 1/053*     (2006.01)
    *F28F 1/02*     (2006.01)
    *F28F 1/12*     (2006.01)
    *F24H 1/24*     (2006.01)
    *F24H 1/40*     (2006.01)
    *F28D 7/16*     (2006.01)
    *F28D 21/00*     (2006.01)
    *F24H 8/00*     (2006.01)

(56) References Cited

U.S. PATENT DOCUMENTS

| | | | | |
|---|---|---|---|---|
| 8,192,688 | B2 * | 6/2012 | Hagen | F01K 21/047 |
| | | | | 422/129 |
| 8,800,642 | B2 * | 8/2014 | Ninagawa | F28F 9/0226 |
| | | | | 165/148 |
| 2006/0175047 | A1 * | 8/2006 | Hattori | B21D 53/085 |
| | | | | 165/133 |
| 2018/0164046 | A1 * | 6/2018 | Oohigashi | B23K 1/00 |
| 2018/0306529 | A1 * | 10/2018 | Kasamatsu | F28F 9/26 |

\* cited by examiner

PRIOR ART

HEAT EXCHANGER AND COMBUSTION DEVICE

CROSS REFERENCE TO RELATED APPLICATION

The present application claims a priority based on a Japanese Patent Application No. 2016-202458 filed on Oct. 14, 2016, the content of which is hereby incorporated by reference in its entirely.

FIELD OF THE INVENTION

The present invention relates to a heat exchanger and a combustion device including the heat exchanger.

BACKGROUND ART

A conventional heat exchanger housed in a combustion device, such as a water heater and a heat source device for a room heater, includes a case body having an upper opening and a lower opening, a plurality of thin plate-shape heat transfer fins arranged side by side at predetermined intervals in the case body, and a plurality of heat-transfer tubes inserted through tube insertion holes provided in each of the heat transfer fins so as to penetrate the heat transfer fins in a direction perpendicular to each of the heat transfer fins. (For example, Japanese Unexamined Patent Publications No. 2011-231993 A and No. 2001-153468 A)

Conventionally, there has been known a heat transfer fin and a heat transfer tube made of highly thermally conductive stainless steel-based metal. The heat transfer fin and the heat transfer tube are bonded with a metallic brazing material (such as a nickel-based brazing material) having a lower melting point than that of the stainless steel-based metal.

FIG. 6A is a schematic front view showing a heat transfer fin (2) used in a conventional heat exchanger. As shown in FIG. 6A, a plurality of heat-transfer-tube insertion holes (20) are formed in a heat transfer fin (2). A brazing material holding portion (21) made by cutting out an upper end edge of the heat transfer fin (2) into a semi-circular shape is formed above each of the heat-transfer-tube insertion holes (20) positioned at the uppermost stage.

In a brazing step for bonding the heat transfer fin (2) and heat transfer tubes (30), first of all, the heat transfer tubes (30) are inserted through the heat-transfer-tube insertion holes (20) of the heat transfer fins (2) arranged side by side in a case body, so that a subassembly is manufactured. Subsequently, as shown in FIG. 6B, after a rod shape or paste brazing material (3) is placed on or applied to the brazing material holding portion (21), the subassembly is heated in a brazing furnace. The fluid brazing material (3) melted by heating then dribbles down to a top portion of an outer circumferential surface of the heat transfer tube (30) inserted through the heat-transfer-tube insertion hole (20) at the uppermost stage from the brazing material holding portion (21), and further flows down a gap between a circumferential edge of the heat-transfer-tube insertion hole (20) of the heat transfer fin (2) and the outer circumferential surface of the heat transfer tube (30) by capillary action. After that, when the brazing material (3) is solidified in a cooling step, the heat transfer tube (30) are brazed and fixed to the circumferential edge of the heat-transfer-tube insertion hole (20) of the heat transfer fin (2) with the brazing material (3).

In the brazing step, ideally, as shown in FIG. 6B, the heat transfer fin (2) is placed in the furnace while being kept in a horizontal posture in such a manner that a center of the heat-transfer-tube insertion hole (20) matches a center of the brazing material holding portion (21) on a vertical line in an up-and-down direction of the case body (not shown). When the heat transfer fin (2) is placed in the furnace in such an idealistic state, the brazing material (3) drops down to the top portion (31) of the outer circumferential surface of the heat transfer tube (30) from the brazing material holding portion (21) as shown by solid arrows in FIG. 6B, and further evenly flows down to the left and right side of the outer circumferential surface of the heat transfer tube (30) from the top portion (31) of the outer circumferential surface. With this configuration, the brazing material spreads over the substantially entire outer circumferential surface of the heat transfer tube (30). Thus, the heat transfer tubes (30) are stably brazed and fixed to the heat-transfer-tube insertion holes (20) of the heat transfer fin (2).

However, in an actual brazing step, as shown in FIG. 6C, the heat transfer fin (2) is placed in the furnace in a non-idealistic state that the heat transfer fin (2) is slightly inclined in the up-and-down direction. When the heat transfer fin (2) is inclined in the up-and-down direction, the brazing material (3) dropping down from the brazing material holding portion (21) flows down only to either the left or right side of the outer circumferential surface of the heat transfer tube (30) from a drop-down position as shown by dotted arrow in FIG. 6C. When the brazing material (3) unevenly flows down to the outer circumferential surface of the heat transfer tube (30) and then is solidified in the cooling step, only a partial region of the heat transfer tube (30) on one side where the brazing material (3) flows is brazed to the circumferential edge of the heat-transfer-tube insertion hole (20) of the heat transfer fin (2). As a result, there is a problem that brazing failure is caused.

SUMMARY OF THE INVENTION

The present invention has been achieved under the above circumstances, and an object of the present invention is to provide a heat exchanger excellent in productivity, in which a brazing material dropping down from a brazing material holding portion evenly spreads over a substantially entire outer circumferential surface of a heat transfer tube regardless of a posture of a heat transfer fin placed in a furnace, and the heat transfer tube can be reliably brazed and fixed to a heat-transfer-tube insertion hole, and a highly thermally efficient combustion device including the heat exchanger.

According to one aspect of the present invention, there is provided a heat exchanger comprising:

a case body having an upper opening and a lower opening, in which combustion exhaust gas flows; and a plurality of heat transfer fins arranged side by side between two facing side walls of the case body, wherein each of the heat transfer fins has a heat-transfer-tube insertion hole through which a heat transfer tube is inserted, and a brazing material holding portion provided above the heat-transfer-tube insertion hole to hold a brazing material, when the heat transfer tube is inserted through the heat-transfer-tube insertion hole, left and right non-contact portions where a circumferential edge of the heat-transfer-tube insertion hole and an outer circumferential surface of the heat transfer tube are not in contact with each other are separately formed on an upper circumferential edge of the heat-transfer-tube insertion hole, and a brazing material guiding portion extending from the brazing material holding portion toward the outer circumferential surface of the heat transfer tube is formed between the left and right non-contact portions.

According to the present invention, even in a case where the heat transfer fin is placed in the furnace in a non-idealistic state that the heat transfer fin is inclined in an up-and-down direction, the brazing material can evenly spread over the substantially entire outer circumferential surface of the heat transfer tube. Thus, the heat transfer tube can be reliably brazed and fixed to the circumferential edge of the heat-transfer-tube insertion hole, and brazing failure of the heat transfer fin and the heat transfer tube can be significantly reduced. Therefore, according to the present invention, the heat exchanger excellent in productivity and the highly thermally efficient combustion device can be obtained.

Other objects, features and advantages of the present invention will become more fully understood from the detailed description given hereinbelow and the accompanying drawings which are given by way of illustration only, and thus are not to be considered as limiting the present invention.

DESCRIPTION OF THE EMBODIMENTS

Hereinafter, referring to drawings, a heat exchanger and a combustion device having the heat exchanger according to an embodiment of the present invention will be described in detail.

Figure 1:
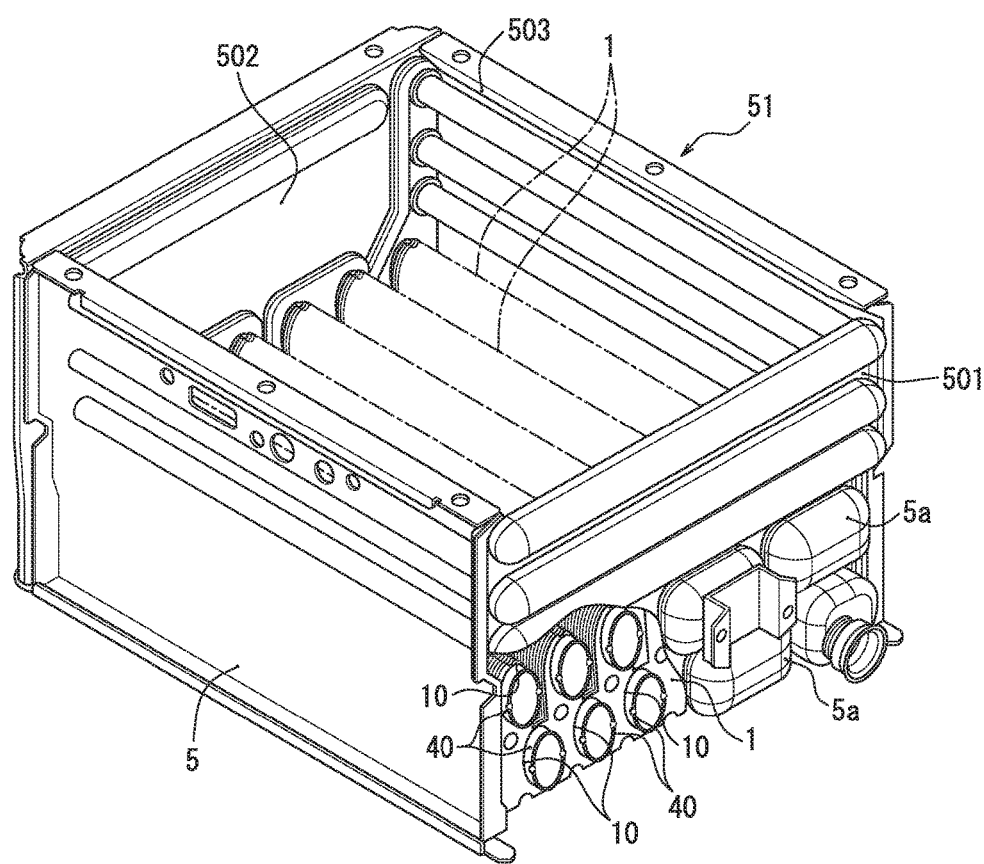
FIG. 1 is a schematic perspective view showing one example of a heat exchanger according to an embodiment of the present invention.

FIG. 1 is a schematic perspective view showing one example of a heat exchanger (51) according to the embodiment of the present invention. Between front and back facing side walls (501), (502) of a case body (5), a plural of thin plate-shape heat transfer fins (1) for heat absorption are arranged side by side at predetermined intervals in parallel to both the side walls (501), (502). In the following description of the present specification, an outside surface of the front side wall (501) corresponds to a front of the heat exchanger (51), a depth direction as viewed from the front of the case body (5) corresponds to a front-and-back direction, and a width direction and a height direction as similarly viewed correspond to a left-and-right direction and an up-and-down direction, respectively.

Figure 2:
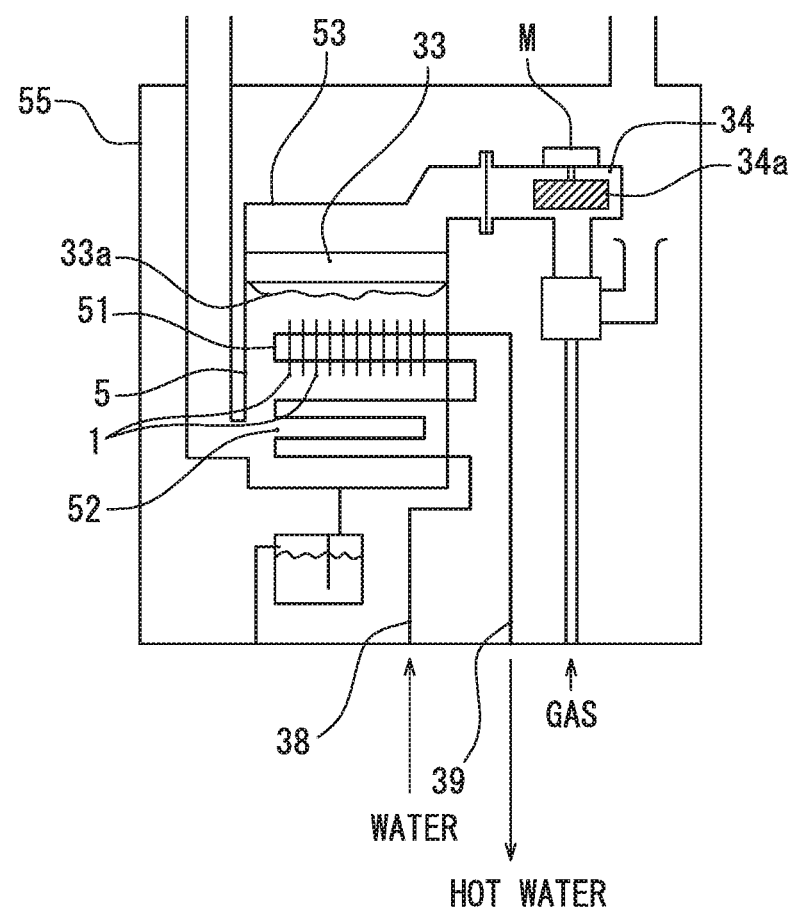
FIG. 2 is a schematic view showing one example of a combustion device including the heat exchanger shown in FIG. 1.

The heat exchanger (51) is used for, for example, a water heater which is a type of a combustion device as shown in FIG. 2. In an upper region of a casing (55), a burner (33) having a downward combustion surface (33a), and a fan (34a) to supply a mixture gas of air and fuel gas into a housing (53) by rotation of a motor (M) are disposed. A fan case (34) provided with the fan (34a) communicates with the housing (53).

The heat exchanger (51) provided in an intermediate region of the housing (53) is a sensible heat recovery type heat exchanger, and a heat exchanger (52) disposed under the heat exchanger (51) is a latent heat recovery type heat exchanger. In the water heater, water supplied from a water supply pipe (38) connected to an upstream side of the lower heat exchanger (52) is pre-heated in the heat exchanger (52) by recovering latent heat in combustion exhaust gas ejected from the burner (33), and then the preheated water is heated in the upper heat exchanger (51) by recovering sensible heat in the combustion exhaust gas. With this configuration, hot water heated at a predetermined temperature is supplied from a hot-water supply pipe (39) connected to a downstream side of the heat exchanger (51) to a certain hot-water supplying terminal.

The case body (5) shown in FIG. 1 has an upper opening (503) and a lower opening (not shown), and forms part of the housing (53). The burner (33) having the downward combustion surface (33a) is provided on an upper side of the case body (5). Thus, the combustion exhaust gas flows downward from the upper opening (503) of the case body (5).

A heat transfer tube (40) has a substantially elliptical cross-sectional shape elongated in the up-and-down direction. A plurality of heat transfer tubes (40) are arranged in a so-called staggered shape in two upper and lower stages in a substantially lower half space inside the case body (5) in such a manner that tube centers of the heat transfer tubes (40) in the upper stage and tube centers of the heat transfer tubes (40) in the lower stage are displaced from one another by a half pitch in the left-and-right direction. Further, the heat transfer tubes (40) penetrate the front and back side walls (501), (502).

Cover portions (5a) are fixed to each of the front and back side walls (501), (502) of the case body (5) in such a manner that each of the cover portions (5a) encloses two of opening end edges of the heat transfer tubes (40) projecting outward from the front and back side walls (501), (502). With this configuration, the water supplied to the heat transfer tubes (40) flows in the heat exchanger (51) through the cover portions (5a) in a meandering manner.

Figure 3:
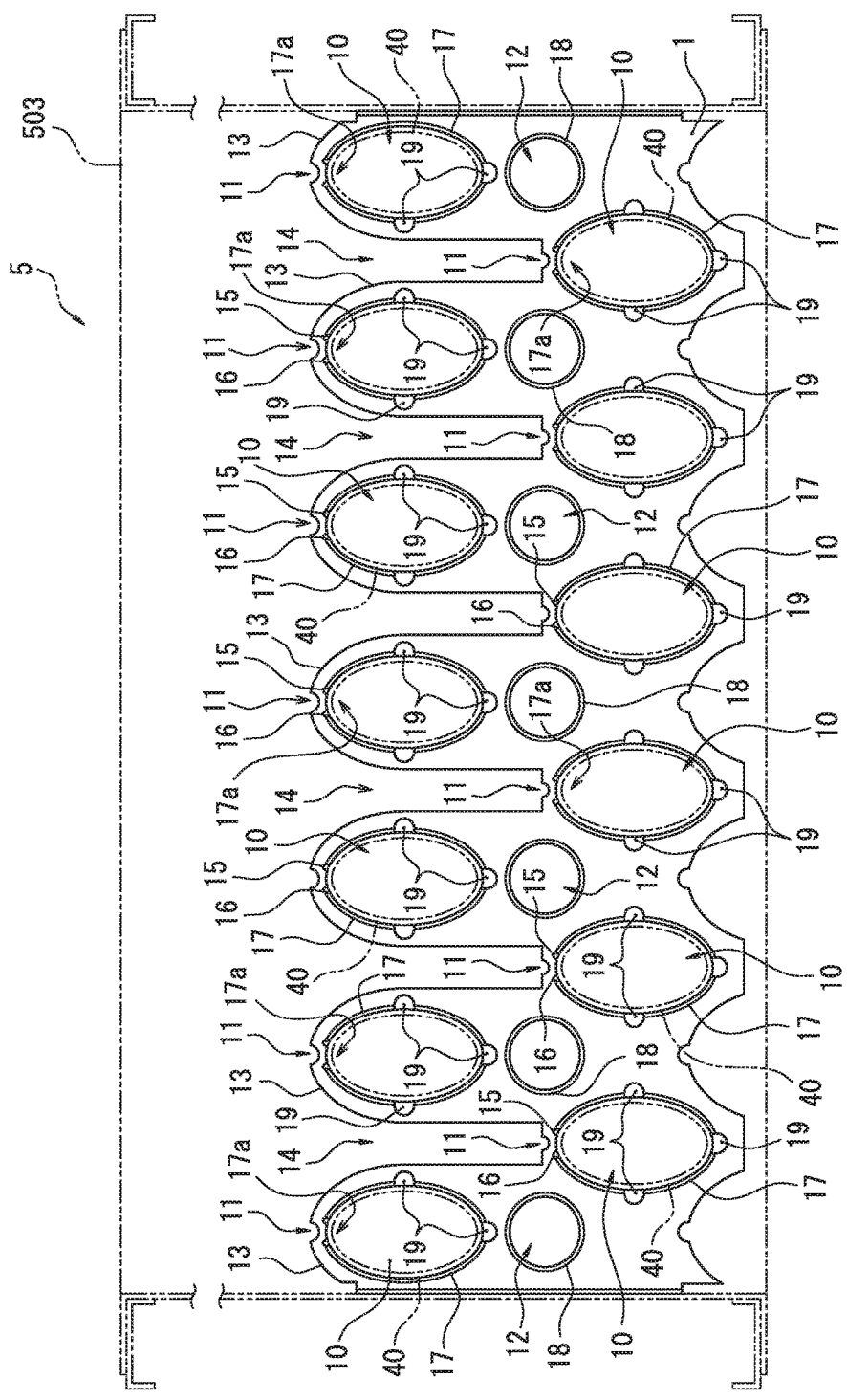
FIG. 3 is a schematic front view showing one example of a heat transfer fin provided in the heat exchanger according to the embodiment of the present invention.

A heat transfer fin (1) is made of a stainless steel-based metal plate. A plurality of heat transfer fins (1) are arranged side by side between the front and back side walls (501), (502) of the case body (5). In each of the heat transfer fins (1), as shown in FIG. 3, a plurality of heat-transfer-tube insertion holes (10) (13 holes in this example) through which the heat transfer tubes (40) are inserted are provided by burring. Each of the heat-transfer-tube insertion holes (10) has a substantially elliptical shape elongated in the up-and-down direction with such size that the heat transfer tube (40) is inserted in a substantially contacted state (for example, with a major axis of 25 mm and a minor axis of 15 mm).

Further, same as an arrangement of the heat transfer tubes (40), the heat-transfer-tube insertion holes (10) are arranged in a so-called staggered shape in two upper and lower stages in such a manner that centers of the heat-transfer-tube insertion holes (10) in the upper stage and tube centers of the heat-transfer-tube insertion holes (10) in the lower stage are displaced from one another by a half pitch in the left-and-right direction.

In a region surrounded by the heat-transfer-tube insertion holes (10) at the upper and lower stages, a plurality of burring holes (12) (7 holes in this example) for deflecting flow of the combustion exhaust gas introduced between the adjacent heat transfer fins (1) from the upper opening (503) of the case body (5) are provided.

Substantially semi-arc shape mountain portions (13) along upper edges of the heat-transfer-tube insertion holes (10) at the upper stage and valley portions (14) between the adjacent mountain portions (13) are formed in an upper end edge of the heat transfer fin (1). Each of the valley portions (14) are cut out up to the vicinity of upper edges of the heat-transfer-tube insertion holes (10) at the lower stage. In a lower end edge of the heat transfer fin (1), and between the adjacent two heat-transfer-tube insertion holes (10) at the lower stage, cut portions are formed in a substantially upward concave semi-elliptical shape (of R1.5 for example) by cutting out a fin lower end portion.

A substantially semi-arc recess portion is formed in each of a top portion center of the mountain portion (13) and a bottom portion center of the valley portion (14). These recess portions function as brazing material holding portions (11) for applying a paste brazing material (4).

A flange portion (17) projecting toward one surface side (the front side in this example) of the heat transfer fan (1) is formed in a circumferential edge of each of the heat-transfer-tube insertion holes (10) except for a portion below the brazing material holding portion (11). When the heat transfer tubes (40) are inserted through the heat-transfer-tube insertion holes (10), outer circumferential surfaces of the heat transfer tubes (40) are substantially in contact with inner circumferential surfaces of the flange portions (17).

Outward bent pieces (19) are formed in the flange portion (17) at both ends of the minor axes and in a lower end edge center of the heat-transfer-tube insertion hole (10).

A no-flange portion (17a) where the flange portion (17) is not provided is formed in an upper circumferential edge of each of the heat-transfer-tube insertion holes (10). When the heat transfer tube (40) is inserted through the heat-transfer-tube insertion hole (10), the upper circumferential edge of the heat-transfer-tube insertion hole (10) is substantially in contact with the outer circumferential surface of the heat transfer tube (40), so that a brazing material guiding portion (100) extending downward from the brazing material holding portion (11) through the no-flange portion (17a) is formed. Further, part of the upper circumferential edge of the heat-transfer-tube insertion hole (10) is cut out in such a manner that left and right non-contact portions (16), (15) where when the heat transfer tube (40) is inserted through the heat-transfer-tube insertion hole (10), the circumferential edge of the heat-transfer-tube insertion hole (10) is not in contact with the outer circumferential surface of the heat transfer tube (40) are formed adjacent to the brazing material guiding portion (100).

Figure 4:
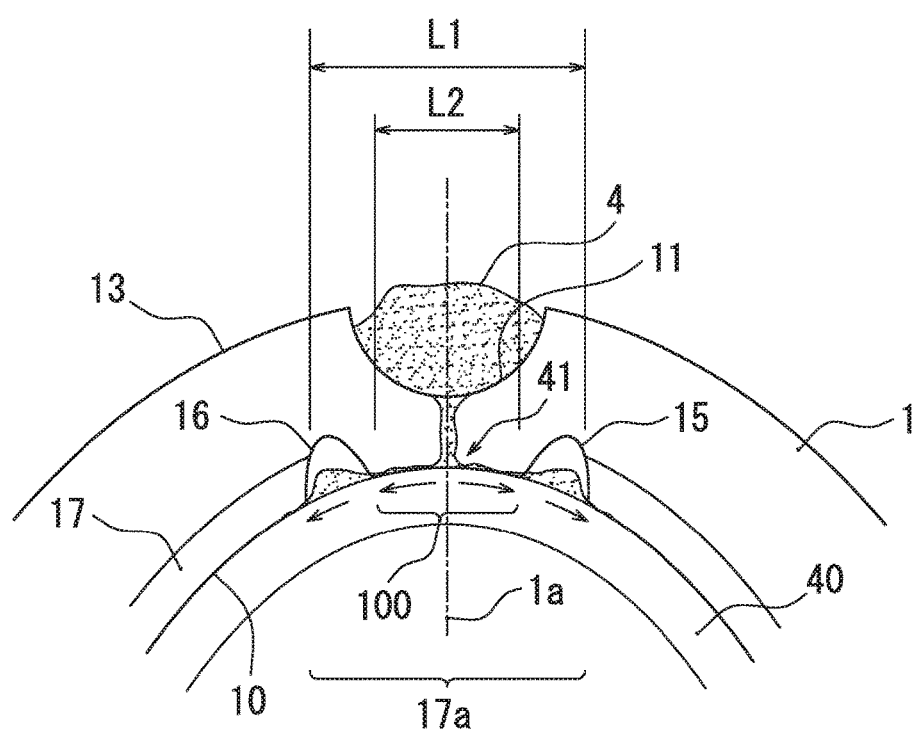
FIG. 4 is a schematic partial enlarged front view showing a state where the heat transfer fin is not inclined in an up-and-down direction, according to the embodiment of the present invention.

More particularly, as shown in FIG. 4, the pair of non-contact portions (15), (16) made by cutting out the part of the upper circumferential edge of the heat-transfer-tube insertion hole (10) into a substantially triangle shape is formed below both left and right ends of the brazing material holding portion (11) and at positions substantially symmetrical with respect to an imaginary line (1a) connecting a center of the brazing material holding portion (11) and a center of the heat-transfer-tube insertion hole (10) in the left-and-right direction. The brazing material guiding portion (100) is formed so as to extend between the non-contact portions (15), (16) from the brazing material holding portion (11). Therefore, the non-contact portions (15), (16) are respectively formed in the circumferential edge of the heat-transfer-tube insertion hole (10) at borders between the flange portion (17) and the no-flange portion (17a) while sandwiching the uppermost edge portion through which the imaginary line (1a) passes in the upper circumferential edge of the heat-transfer-tube insertion hole (10). In the present embodiment, a distance (L1) between outer end edges of the non-contact portions (15), (16) is set to be about 4 mm and a distance (L2) between inner end edges of the non-contact portions (15), (16) is set to be about 2.6 mm.

Next, a method of connecting the heat transfer fin (1) with the heat transfer tube (40) of the present embodiment will be described.

First of all, the plurality of heat transfer fins (1) is accommodated in the case body (5) in parallel with the front and back side surface (501), (502). At this time, since the flange portions (17) having the bent pieces (19) on the one surface side are formed in each of the heat transfer fins (1), the bent pieces (19) projecting on the one surface side are abutted with other surface of the adjacent heat transfer fin (1). Therefore, the plurality of heat transfer fins (1) are laminated with gaps corresponding to a projecting amount of the flange portions (17). Subsequently, the heat transfer tubes (40) are introduced into the case body (5) from heat-transfer-tube introduction holes (not shown) provided in the front and back side walls (501), (502), and further, the heat transfer tubes (40) are inserted through the heat-transfer-tube insertion holes (10) provided in each of the heat transfer fins (1). At this time, since the heat-transfer-tube insertion hole (10) and the heat transfer tube (40) have the substantially same shape and size, the circumferential edge of the heat-transfer-tube insertion hole (10) except for regions where the non-contact portions (15), (16) are formed is substantially in contact with the outer circumferential surface of the heat transfer tube (40). In other word, the circumferential edge of the heat-transfer-tube insertion hole (10) and the outer circumferential surface of the heat transfer tube (40) are substantially in contact with each other except for at the non-contact portions (15), (16). With this configuration, thermal efficiency can be improved.

The paste brazing material (4) is applied to the brazing material holding portions (11) in the top portion center of the mountain portions (13) and the bottom portion center of the valley portions (14) of the heat transfer fin (1) in which the heat transfer tubes (40) are inserted through the heat-transfer-tube insertion holes (10) in the case body (5) as described above. At this time, since all the brazing material holding portions (11) are formed to open upward, the brazing material (4) can be easily and reliably applied to each of the brazing material holding portions (11) from an upper side of the heat transfer fin (1) without disturbance by the heat transfer fin (1), the case body (5), a filling machine of the brazing material and the like. Moreover, in an inspection step for checking whether or not the brazing material (4) has been applied to all the brazing material holding portions (11) appropriately, brazing condition are easily recognizable visually or via an inspection camera.

After the subassembly to which the brazing material is applied is manufactured, the brazing material is melted by heating in the furnace. As shown in FIG. 4, in a case where the heat transfer fin (1) is accommodated in the case body (5)

in an idealistic state that the heat transfer fin (1) is less inclined in the up-and-down direction and held in a horizontal posture, the brazing material (4) melted by heating drops down to a top portion (41) of the outer circumferential surface of the heat transfer tube (40) positioned directly below the brazing material holding portion (11) and positioned on the imaginary line (1a) from the brazing material holding portion (11).

Subsequently, the brazing material (4) comes in between the outer circumferential surface of the heat transfer tube (40) and a lower end of the brazing material guiding portion (100) substantial in contact with the outer circumferential surface of the heat transfer tube (40) by capillary action. Further, as shown by solid arrows in FIG. 4, after the brazing material (4) substantially evenly flows to the left and right of the lower end of the brazing material guiding portion (100), the brazing material (4) goes over the non-contact portions (15), (16), and then flows down to a region where the outer circumferential surface of the heat transfer tube (40) is substantially in contact with the inner circumferential surface of the flange portion (17).

Figure 5:
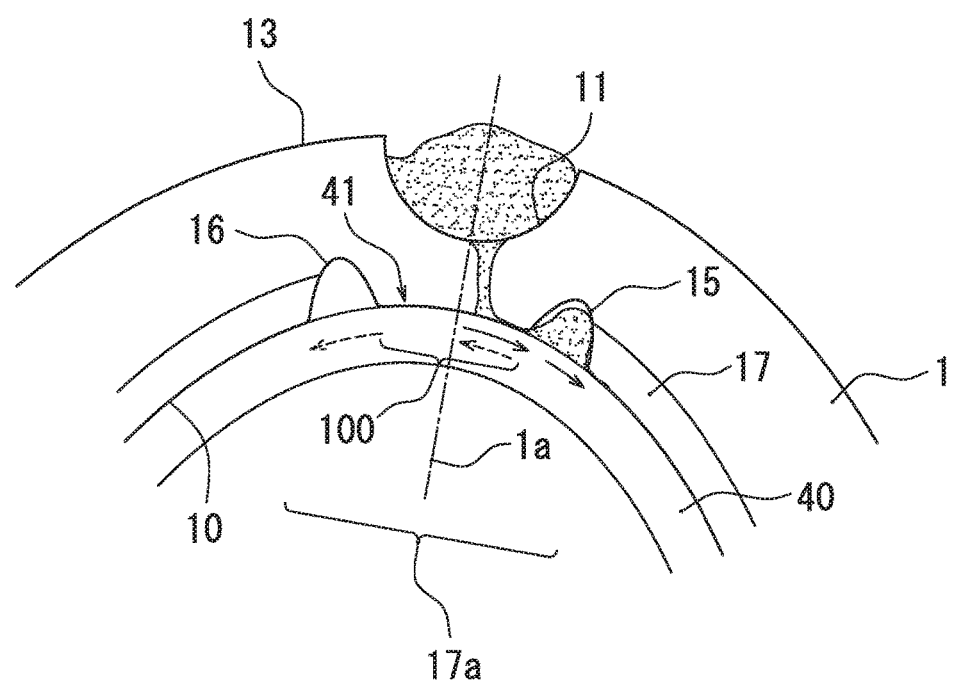
FIG. 5 is a schematic partial enlarged front view showing a state where the heat transfer fin is inclined in the up-and-down direction, according to the embodiment of the present invention.
Figure 6A:
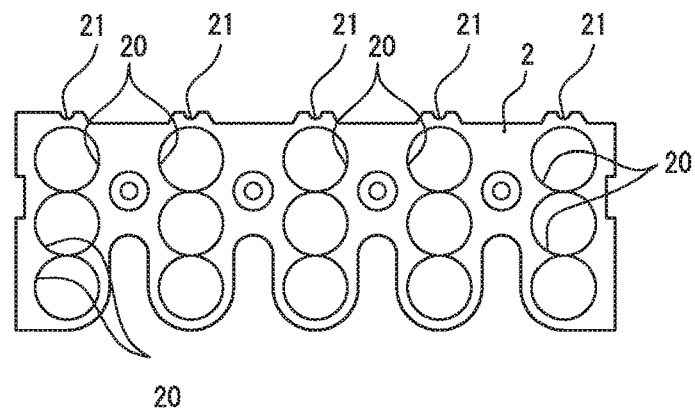
FIG. 6A is a schematic front view showing a conventional heat transfer fin.
Figure 6B:
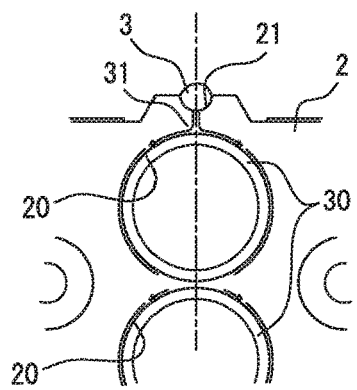
FIG. 6B is a schematic partial enlarged front view showing a state where the conventional heat transfer fin is not inclined in the up-and-down direction.
Figure 6C:
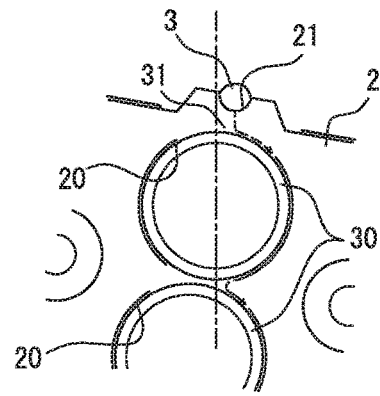
FIG. 6C is a schematic partial enlarged front view showing a state where the conventional heat transfer fin is inclined in the up-and-down direction.

However, the parts such as the heat transfer fin (1), the heat transfer tubes (40), and the case body (5) have size error at the time of manufacturing. Further, upon manufacture of the subassembly, accommodating all the heat transfer fins (1) and the heat transfer tubes (40) in the case body (5) so as to form the idealistic state is extremely difficult. Therefore, in an actual subassembly, as shown in FIG. 5, the heat transfer fin (1) tends to be accommodated in the case body (5) in a non-idealistic state that the imaginary line (1a) is inclined to either the left or right side and the heat transfer fin (1) is inclined in the up-and-down direction. When the heat transfer fin (1) is accommodated in the case body (5) in such a non-idealistic state, the brazing material (4) melted by heating drops down to a position displaced to either the left or right side from a position where the imaginary line (1a) passes through the outer circumferential surface of the heat transfer tube (40). Since the brazing material guiding portion (100) in substantial contact with the outer circumferential surface of the heat transfer tube (40) is formed below the brazing material holding portion (11), as shown by solid arrows in FIG. 5, the brazing material (4) passes between the outer circumferential surface of the heat transfer tube (40) and the lower end of the brazing material guiding portion (100) forming the upper circumferential edge of the heat-transfer-tube insertion hole (10) by capillary action, and flows down along either the left or right side of the outer circumferential surface of the heat transfer tube (40).

At this time, since the non-contact portions (15), (16) where the circumferential edge of the heat-transfer-tube insertion hole (10) is not in contact with the outer circumferential surface of the heat transfer tube (40) are formed on the left and right of the lower end of the brazing material guiding portion (100), the brazing material (4) is once caught for example by the non-contact portion (15) on one side and retained in the non-contact portion (15). The brazing material (4) retained in the non-contact portion (15) is then pushed by the brazing material (4) newly dropping down from the brazing material holding portion (11) and spills over the non-contact portion (15). As a result, part of the brazing material (4) goes over the non-contact portion (15) and flows in the clockwise direction shown by solid arrows between the inner circumferential surface of the flange portion (17) formed in the circumferential edge of the heat-transfer-tube insertion hole (10) and the outer circumferential surface of the heat transfer tube (40) by capillary action.

However, other part of the brazing material (4) flows back in the counterclockwise direction shown by dotted arrows toward a drop-down position from the non-contact portion (15). When the brazing material (4) goes over the drop-down position and reaches the top portion (41) of the outer circumferential surface at the highest position of the outer circumferential surface of the heat transfer tube (40) at the time of accommodating, the brazing material (4) flows down to other side of the non-contact portion (16). Further, the brazing material (4) flowing down to the other side of the non-contact portion (16) goes over the non-contact portion (16) and flows between the inner circumferential surface of the flange portion (17) formed in the circumferential edge of the heat-transfer-tube insertion hole (10) and the outer circumferential surface of the heat transfer tube (40) by capillary action.

According to the present embodiment, when the heat transfer tube (40) is inserted through the heat-transfer-tube insertion hole (10), the brazing material guiding portion (100) of which the lower end is substantially in contact with the outer circumferential surface of the heat transfer tube (40) is formed at the upper circumferential edge of the heat transfer tube insertion hole (10) positioned below the brazing material holding portion (11), and the non-contact portions (15), (16) are formed on the left and right of the lower end of the brazing material guiding portion (100).

Therefore, when the subassembly in which the heat transfer fins (1) are accommodated in the non-idealistic state that the heat transfer fins (1) are inclined in the up-and-down direction is subjected to a brazing step, and even when the brazing material (4) dropping down from the brazing material holding portion (11) flows only to either the left or right side of the outer circumferential surface of the heat transfer tube (40), the brazing material (4) can be once caught by the non-contact portion (15) or (16) and retained in the non-contact portion (15) or (16), and the brazing material (4) spilling over the non-contact portion (15) or (16) is be pushed back to the other side. With this configuration, even in a case where the heat transfer fin (1) is placed in the furnace in the non-idealistic state that the heat transfer fin is inclined in the up-and-down direction, a flow of the brazing material (4) only to the one side of the outer circumferential surface of the heat transfer tube (40) is prevented, so that the brazing material can evenly spread over the substantially entire outer circumferential surface of the heat transfer tube (40).

Furthermore, even when postures of the heat transfer fins (1) are different from each other, the heat transfer tubes (40) can be reliably brazed and fixed to the heat-transfer-tube insertion holes (10) of all the heat transfer fins (1). Accordingly, brazing failure can be significantly reduced. Moreover, since the lower end of the brazing material guiding portion (100) provided between the non-contact portions (15), (16) is substantially in contact with the outer circumferential surface of the heat transfer tube (40), a decrease in thermal efficiency can also be suppressed.

In particular, since the non-contact portions (15), (16) are formed at the borders between the flange portion (17) projecting on the one surface side (front side) of the heat transfer fin (1) from the circumferential edge of the heat-transfer-tube insertion hole (10) and the no-flange portion (17a) below the brazing material holding portion (11), the brazing material (4) dropping down from the brazing material holding portion (11) is reliably caught by the non-contact portions (15), (16) and end edges of the flange portion (17), and the brazing material (4) is retained in the non-contact portions (15), (16). Moreover, the brazing material (4) going over the non-contact portions (15), (16) comes in between the outer circumferential surface of the heat transfer tube (40) and the inner circumferential surface of the flange portion (17) having a predetermined projecting amount. Therefore, the heat transfer tubes (40) can be strongly brazed and fixed to the heat-transfer-tube insertion holes (10).

Further, since the heat transfer tube (40) has a substantially elliptical cross-sectional shape elongated in the up-and-down direction, the brazing material (4) smoothly flows downward, as compared with a conventional heat transfer tube having a circular cross-sectional shape. Accordingly, the heat transfer tubes (40) can be reliably brazed and fixed to the heat-transfer-tube insertion holes (10) with less brazing material (4).

In a case where the heat transfer fin (1) according to the present embodiment is applied to the sensible heat exchanger (51) of the water heater shown in FIG. 2, the heat transfer fin (1) is accommodated in the case body (5) in the direction shown in FIG. 3 in such a manner that the heat-transfer-tube insertion holes (10) on the upper stage side are positioned on an upstream side of a flow passage of the combustion exhaust gas. In this water heater, the combustion exhaust gas ejected from the burner (33) flows downward from the upper opening (503) in the case body (5). Thus, a portion of the heat transfer fin (1) on the side of the upper opening (503) is heated to have a higher temperature. As a result, an upper portion of the heat transfer fin (1) is susceptible to thermal deformation. However, when the heat transfer fin (1) is accommodated in the case body (5) in such a manner that the non-contact portions (15), (16) are positioned on the side of the upper opening (503), and even when the upper portion of the heat transfer fin (1) is thermally deformed due to contact with the high-temperature combustion exhaust gas, the thermal deformation is absorbed by the non-contact portions (15), (16). Therefore, a decrease in thermal efficiency can be prevented.

According to the present embodiment described above, the brazing material guiding portion (100) extends downward in such a manner that the lower end of the brazing material guiding portion (100) is substantially in contact with the outer circumferential surface of the heat transfer tube (40). However, the brazing material guiding portion (100) may be formed in such a manner that a small gap is formed between the lower end of the brazing material guiding portion (100) and the outer circumferential surface of the heat transfer tube (40).

The heat exchanger (51) is applicable to a heat exchanger housed in a combustion device, such as a condensing water heater, a heat source device for a storage water heating system, a water heater having a bath reheating function, a water heater having only a water heating function, a heat source device for a room and water heater, and a hot water room heater, other than the water heater described above.

As described in detail, the present invention is summarized as follows.

According to one aspect of the present invention, there is provided a heat exchanger comprising:

a case body having an upper opening and a lower opening, in which combustion exhaust gas flows; and a plurality of heat transfer fins arranged side by side between two facing side walls of the case body, wherein each of the heat transfer fins has a heat-transfer-tube insertion hole through which a heat transfer tube is inserted, and a brazing material holding portion provided above the heat-transfer-tube insertion hole to hold a brazing material, when the heat transfer tube is inserted through the heat-transfer-tube insertion hole, left and right non-contact portions where a circumferential edge of the heat-transfer-tube insertion hole and an outer circumferential surface of the heat transfer tube are not in contact with each other are separately formed on an upper circumferential edge of the heat-transfer-tube insertion hole, and a brazing material guiding portion extending from the brazing material holding portion toward the outer circumferential surface of the heat transfer tube is formed between the left and right non-contact portions.

According to the heat exchanger described above, the non-contact portions where the circumferential edge of the heat-transfer-tube insertion hole and the outer circumferential surface of the heat transfer tube are not in contact with each other are formed spaced apart to the left and right of the upper circumferential edge of the heat-transfer-tube insertion hole. Thus, when the heat transfer fin is placed in the furnace in an idealistic state that the heat transfer fin is held in a horizontal posture, the brazing material dropping down from the brazing material holding portion flows down to the brazing material guiding portion below the brazing material holding portion, and further evenly flows down along the outer circumferential surface of the heat transfer tube to the left and right of the outer circumferential surface of the heat transfer tube from a drop-down position. On the other hand, when the heat transfer fin is placed in the furnace in a non-idealistic state that the heat transfer fin is inclined in the up-and-down direction, the brazing material flows down only to either the left or right side of the outer circumferential surface of the heat transfer tube from the drop-down position.

However, according to the heat exchanger described above, since the non-contact portions are separately formed on the left and right of the brazing material guiding portion and at the upper circumferential edge of the heat transfer tube insertion hole positioned below the brazing material holding portion, spaces each having a predetermined size are formed between the circumferential edge of the heat transfer tube insertion hole and the outer circumferential surface of the heat transfer tube. Thus, the brazing material dropping down to the circumferential edge of the heat transfer tube insertion hole in a lower side from the brazing material holding portion in an upper side does not immediately flow downward between the circumferential edge of the heat transfer tube insertion hole and the outer circumferential surface of the heat transfer tube, and a flow of the brazing material is once caught by one of the non-contact portions, and the brazing material is retained in the space.

The brazing material retained in the space is then pushed by the brazing material newly dropping down from the brazing material holding portion through the brazing material guiding portion, so that part of the brazing material flows down between the circumferential edge of the heat transfer tube insertion hole and the outer circumferential surface of the heat transfer tube on one side.

However, other part of the brazing material flows back toward the drop-down position. The brazing material having flown back goes over the drop-down position and flows downward between the circumferential edge of the heat transfer tube insertion hole and the outer circumferential surface of the heat transfer tube on other side.

Thus, according to the heat exchanger described above, even in a case where the heat transfer fin is placed in the furnace in the non-idealistic state that the heat transfer fin is inclined in the up-and-down direction, a flow of the brazing material only to either the left or right side of the outer circumferential surface of the heat transfer tube can be prevented. Therefore, the brazing material can evenly spread over the substantially entire outer circumferential surface of the heat transfer tube.

Furthermore, according to the heat exchanger described above, since the brazing material guiding portion is formed so as to pass through between the left and right non-contact portions and extend toward the outer circumferential surface of the heat transfer tube. Therefore, when the brazing material guiding portion is formed in such a manner that a lower end of the brazing material guiding portion is brought into substantial contact with the outer circumferential surface of the heat transfer tube, a decrease in thermal efficiency can also be suppressed.

Preferably, in the above-described heat exchanger, each of the heat transfer fins has, in the circumferential edge of the heat-transfer-tube insertion hole, a flange portion projecting toward one surface side and a no-flange portion where the flange portion is not provided, wherein the no-flange portion is formed below the brazing material holding portion, and the left and right non-contact portions are formed at borders between the flange portion and the no-flange portion, respectively.

In a case where the flange portion projecting toward the one surface side of the heat transfer fin is formed in the circumferential edge of the heat-transfer-tube insertion hole, the heat transfer tube can be strongly brazed and fixed to the circumferential edge of the heat-transfer-tube insertion hole.

Further, the no-flange portion where the flange portion is absent is formed below the brazing material holding portion, while the flange portion is formed in the circumferential edge of the heat-transfer-tube insertion hole. Thus, it makes possible to directly drop down the brazing material flowing downward from the brazing material holding portion to the outer circumferential surface of the heat transfer tube.

Furthermore, since the left and right non-contact portions are respectively formed at the borders between the flange portion and the no-flange portion, the brazing material having flown along the outer circumferential surface of the heat transfer tube through the no-flange portion is securely caught by end edges of the flange portion. Thus, it makes possible to securely retain the brazing material in a predetermined amount in the space formed by each of the left and right non-contact portions. Therefore, even in a case where the heat transfer fin is placed in the furnace in the non-idealistic state that the heat transfer fin is inclined in the up-and-down direction, the brazing material can evenly spread over the substantially entire outer circumferential surface of the heat transfer tube.

Preferably, in the above-described heat exchanger, the heat transfer tube has a substantially elliptical cross-sectional shape elongated in an up-and-down direction, the heat-transfer-tube insertion hole has a substantially elliptical shape elongated in the up-and-down direction, and the left and right non-contact portions are formed substantially symmetrically with respect to a major axis of the heat-transfer-tube insertion hole.

According to the heat exchanger described above, the outer circumferential surface of the heat transfer tube has a sharp shape in the up-and-down direction, as compared with a conventional heat transfer tube having a circular cross-sectional shape. Thus, the brazing material dropping down from the brazing material holding portion to the outer circumferential surface of the heat transfer tube smoothly flows downward from the drop-down position to the left and right thereof. Therefore, the brazing material can evenly spread over the substantially entire outer circumferential surface of the heat transfer tube and the heat transfer tube can be reliably brazed and fixed to the heat-transfer-tube insertion hole with less brazing material.

Preferably, in the above-described heat exchanger, the left and right non-contact portions are positioned on an upstream side of a flow passage of the combustion exhaust gas in the case body.

According to the heat exchanger described above, the heat transfer fin is provided in the case body in such a manner that the left and right non-contact portions are positioned on the upstream side heated to have a higher temperature. Therefore, even when the heat transfer fin is thermally deformed, the left and right non-contact portions can absorb such a deformation.

According to another aspect of the present invention, there is provided a combustion device comprising the above-described heat exchanger.

According to the combustion device described above, since brazing failure of the heat transfer fin and the heat transfer tube can be significantly reduced, the heat transfer tube can be reliably brazed and fixed to the heat-transfer-tube insertion hole. Therefore, a highly thermally efficient combustion device including the heat exchanger excellent in productivity can be obtained.

Although the present invention has been described in detail, the foregoing descriptions are merely exemplary at all aspects, and do not limit the present invention thereto. It should be understood that an enormous number of unillustrated modifications may be assumed without departing from the scope of the present invention.

What is claimed is:
1. A heat exchanger comprising:
a case body having an upper opening and a lower opening, in which combustion exhaust gas flows; and
a plurality of heat transfer fins arranged side by side between two facing side walls of the case body, wherein
each of the heat transfer fins has a heat-transfer-tube insertion hole through which a heat transfer tube is inserted, and a brazing material holding portion provided above the heat-transfer-tube insertion hole to hold a brazing material, wherein
two parts of an upper circumferential edge of the heat-transfer-tube insertion hole are cut out upward, when the heat transfer tube is inserted through the heat-transfer-tube insertion hole, left and right non-contact portions where a circumferential edge of the heat-transfer-tube insertion hole and an outer circumferential surface of the heat transfer tube are not in contact with each other are separately formed on an upper circumferential edge of the heat-transfer-tube insertion hole, and
when the heat transfer tube is inserted through the heat-transfer-tube insertion hole, left and right non-contact portions where a circumferential edge of the heat-transfer-tube insertion hole and an outer circumferential surface of the heat transfer tube are not in contact with each other are separately formed on the upper circumferential edge of the heat-transfer-tube insertion hole so as to form two separated spaces between the upper circumferential edge of the heat-transfer-tube insertion hole and the outer circumferential surface of the heat transfer tube in a circumferential direction of the heat-transfer-tube insertion hole by the two parts, and a brazing material guiding portion extending from the brazing material holding portion toward the outer circumferential surface of the heat transfer tube is formed between the left and right non-contact portions.

2. The heat exchanger according to claim 1, wherein each of the heat transfer fins has, in the circumferential edge of the heat-transfer-tube insertion hole, a flange portion projecting toward one surface side and a no-flange portion where the flange portion is not provided, wherein the no-flange portion is formed below the brazing material holding portion, and the left and right non-contact portions are formed at borders between the flange portion and the no-flange portion, respectively.

3. The heat exchanger according to claim 1, wherein the heat transfer tube has a substantially elliptical cross-sectional shape elongated in an up-and-down direction, the heat-transfer-tube insertion hole has a substantially elliptical shape elongated in the up-and-down direction, and the left and right non-contact portions are formed substantially symmetrically with respect to a major axis of the heat-transfer-tube insertion hole.

4. The heat exchanger according to claim 1, wherein the left and right non-contact portions are positioned on an upstream side of a flow passage of the combustion exhaust gas in the case body.

5. A combustion device comprising the heat exchanger according to claim 1.

* * * * *